United States Patent
Uchida

[11] Patent Number: 5,819,546
[45] Date of Patent: Oct. 13, 1998

[54] ABSORPTION CHILLER

[75] Inventor: Shuichiro Uchida, Tsuchiura, Japan

[73] Assignee: Hitachi, Ltd., Tokyo, Japan

[21] Appl. No.: 714,394

[22] Filed: Sep. 16, 1996

[30] Foreign Application Priority Data

Sep. 20, 1995 [JP] Japan .................................. 7-241252

[51] Int. Cl.$^6$ .................................................. F25B 15/00
[52] U.S. Cl. .............................................. 62/141; 62/483
[58] Field of Search ........................... 62/141, 148, 101, 62/476, 105, 483

[56] References Cited

U.S. PATENT DOCUMENTS

| | | | |
|---|---|---|---|
| 3,626,710 | 12/1971 | Porter ........................................ | 62/141 |
| 4,202,181 | 5/1980 | Lamb ........................................ | 62/141 |
| 4,718,243 | 1/1988 | Buschulte et al. ........................ | 62/101 |
| 5,224,352 | 7/1993 | Arima et al. .............................. | 62/141 |
| 5,592,825 | 1/1997 | Inoue ....................................... | 62/141 |

FOREIGN PATENT DOCUMENTS 3-84371  4/1991  Japan .

*Primary Examiner*—William Doerrler
*Attorney, Agent, or Firm*—Antonelli, Terry, Stout, & Kraus, LLP

[57] ABSTRACT

An absorption chiller having a high temperature generator and a low temperature generator includes a pressure detecting means for detecting a pressure within the high temperature generator, a concentration fixing control means for controlling a concentration of the solution of the high temperature generator or of the low temperature generator, a selection converter for receiving two output signals from the pressure detecting means and the concentration fixing control means as inputs, selecting and outputting a higher one of these input signals, and a rotational speed controlling device for controlling a rotational speed of the solution pump by the output signal of this selection converter. An absorption solution is controlled adequately in its circulation quantity in accordance with a load from a low load range to a high load range of this absorption chiller, so that the solution is not crystallized even in the low load range, and efficiency during a partial load operation is improved.

11 Claims, 4 Drawing Sheets

ABSORPTION CHILLER

BACKGROUND OF THE INVENTION

1. Field of the Invention

The present invention relates to an absorption chiller which is capable of adequately controlling a circulation quantity of a solution in a high load range and also in a low load range.

2. Description of the Related Art

In a conventional absorption chiller, it has been known that, in order to control a quantity of an absorption solution supplied from an absorber to a low temperature generator and a high temperature generator, a liquid level, a pressure or a temperature in the low temperature generator or in the high temperature generator is detected and an inverter device is used for carrying out a frequency control to control a rotational speed of a pump for supplying the absorption solution to each generator.

More particularly, the quantity of the solution supplied from the absorber to the low temperature generator and to the high temperature generator, namely the quantity of the absorption solution diluted by the absorbing of a refrigerant is controlled only by a temperature of a cooling water or only by the liquid level, the pressure or the temperature in the generator, and otherwise that control is carried out only so as to maintain a solution concentration constant by detecting the pressure and the temperature of the solution in the generator.

One of the above-mentioned controls is disclosed in the Japanese Unexamined Patent Publication No. 3-84371.

In the control carried out by the liquid level, the pressure or the temperature in the generator or only by maintaining the concentration within the generator constant, however, a problem arises that the solution might be crystallized when suffering bad conditions repeatedly.

That is, in a plant having a plurality of absorption chillers arranged therein or a plant such as a clean room requiring cooling at all times of the year, a load at 100% happens to be imposed to an absorption chiller even at the time of the year when a temperature of an outdoor atmosphere is low and a temperature of a cooling water at an inlet of the absorption chiller becomes lower especially in a spring or an autumn season. For instance under this condition, when the quantity of the absorption solution is controlled only by the pressure in the high temperature generator, the pressure in the condensor is lowered by the lowering of the inlet temperature of the cooling water and then the pressure in the high temperature generator is lowered. Therefore, in spite of full load, a circulation quantity of the solution is reduced. In the high temperature generator, however, since a quantity of input heat is kept constant and the temperature of the solution is maintained high, the concentration of the solution becomes higher to cause the crystallization.

Further, when the control is carried out only so as to keep constant the concentration of the solution in the generator, since the control in the low load region comes to be carried out at a point near to a crystallization line thereof, it is possible that the solution is crystallized.

SUMMARY OF THE INVENTION

The present invention is directed to solving the problems of the above-mentioned prior art and has for its object to provide an absorption chiller which is capable of preventing the crystallizing of a solution during its operation from a high load range to a low load range, thereby improving the coefficient of performance.

The above-mentioned object is accomplished by providing an absorption chiller including an evaporator for cooling a chilled water, an absorber for absorbing a refrigerant vapor from the evaporator, a high temperature generator and a low temperature generator for separating an absorption solution sent from the absorber under the condition that its absorbing capacity is decreased by the absorbing of the refrigerant vapor and an absorption solution having recovered its absorbing capacity, a condenser for condensing the refrigerant vapor generated in those high temperature generator and low temperature generator, a solution pump for circulating the solution and a flow passage for connecting the above-mentioned apparatus to one another, the absorption chiller further including a pressure detecting means for detecting a pressure in the high temperature generator, a concentration fixing control means for controlling a concentration of the solution in the high temperature generator or the low temperature generator so as to be kept constant, a selection converter for receiving two output signals from the pressure detecting means and the concentration fixing control means as inputs, selecting and outputting a higher one of these input signals, and a rotational speed controlling device for controlling a rotational speed of the solution pump by the output signal of the selection converter.

In the above-mentioned absorption chiller, the solution pump for supplying the absorption solution from the absorber to the low temperature generator and the high temperature generator is controlled in the rotational speed by the rotational speed controlling device. In this rotational speed controlling method, the circulation quantity of the solution is controlled to an adequate value by the selecting converter which selects one signal having a larger output from two signals including a signal obtained from the pressure and the temperature of the high temperature generator for controlling the solution concentration in the high temperature generator so as to be kept constant and a pressure signal in the high temperature generator, and outputs the selected signal to the rotational speed controlling device.

Herein, since usually the pressure in the high temperature generator is previously set so as to be selected as the control signal, the rotational speed of the solution pump is controlled by the rotational speed controlling device so as to increase the rotational speed of the absorption solution pump when the pressure in the high temperature generator is higher and to decrease the rotational speed of the solution pump when the pressure therein is lower. Therefore, throughout the operation range from the low load range to the high load range, the circulation quantity of the absorption solution is controlled corresponding to a load, so that the solution is not crystallized even in the low load range, and efficiency during a partial load operation is improved.

Further, in the high load range, for instance when a temperature of the cooling water lowers, the pressure in the high temperature generator is decreased and the pressure signal therein is outputted so as to decrease the rotational speed of the solution pump. On one hand, when a concentration of the solution in the high temperature generator nearly exceeds a set limit concentration, the signal obtained from the pressure and the temperature in the high temperature generator for controlling the solution concentration so as to be kept constant increases its output so as to maintain the concentration within the set limit concentration. But, then the signal for controlling the concentration of the solution so as to be kept constant is selected by the selection converter, and as a result, since the signal is outputted to the rotational speed controlling device so as to increase the rotational speed of the solution pump, the operation can be continued stably without crystallizing the solution.

DETAILED DESCRIPTION OF THE PREFERRED EMBODIMENTS

One embodiment of the present invention will be explained with reference to FIGS. 1 to 4.

Figure 1:
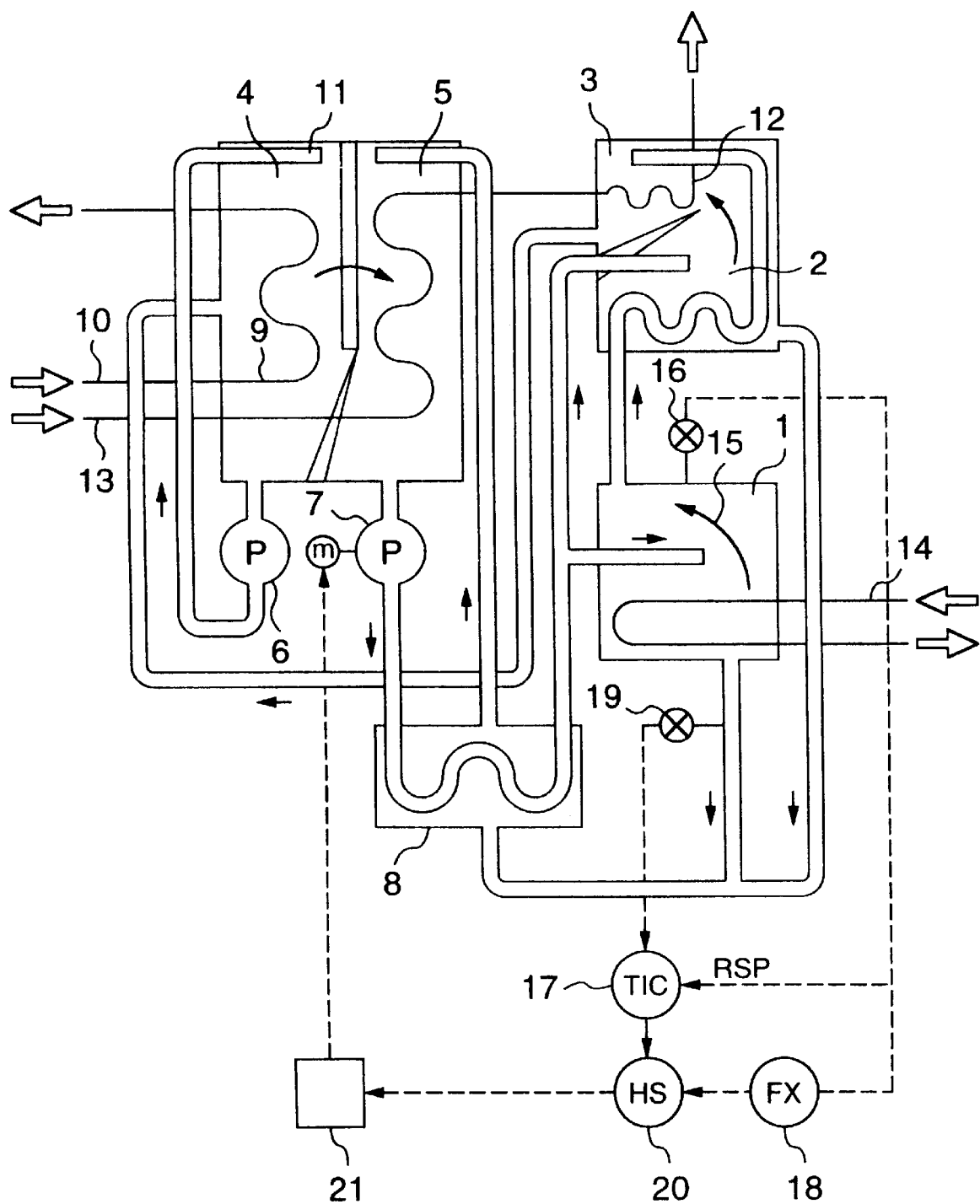
FIG. 1 is a system view of two stage absorption chiller according to one embodiment of the present invention.

FIG. 1 shows an embodiment of a two stage absorption chiller, and this absorption chiller includes a high temperature generator 1, a low temperature generator 2, a condenser 3, an evaporator 4, an absorber 5, a refrigerant pump 6 for circulating a refrigerant, a solution pump 7 for circulating an absorption solution and a heat exchanger 8.

Figure 4:
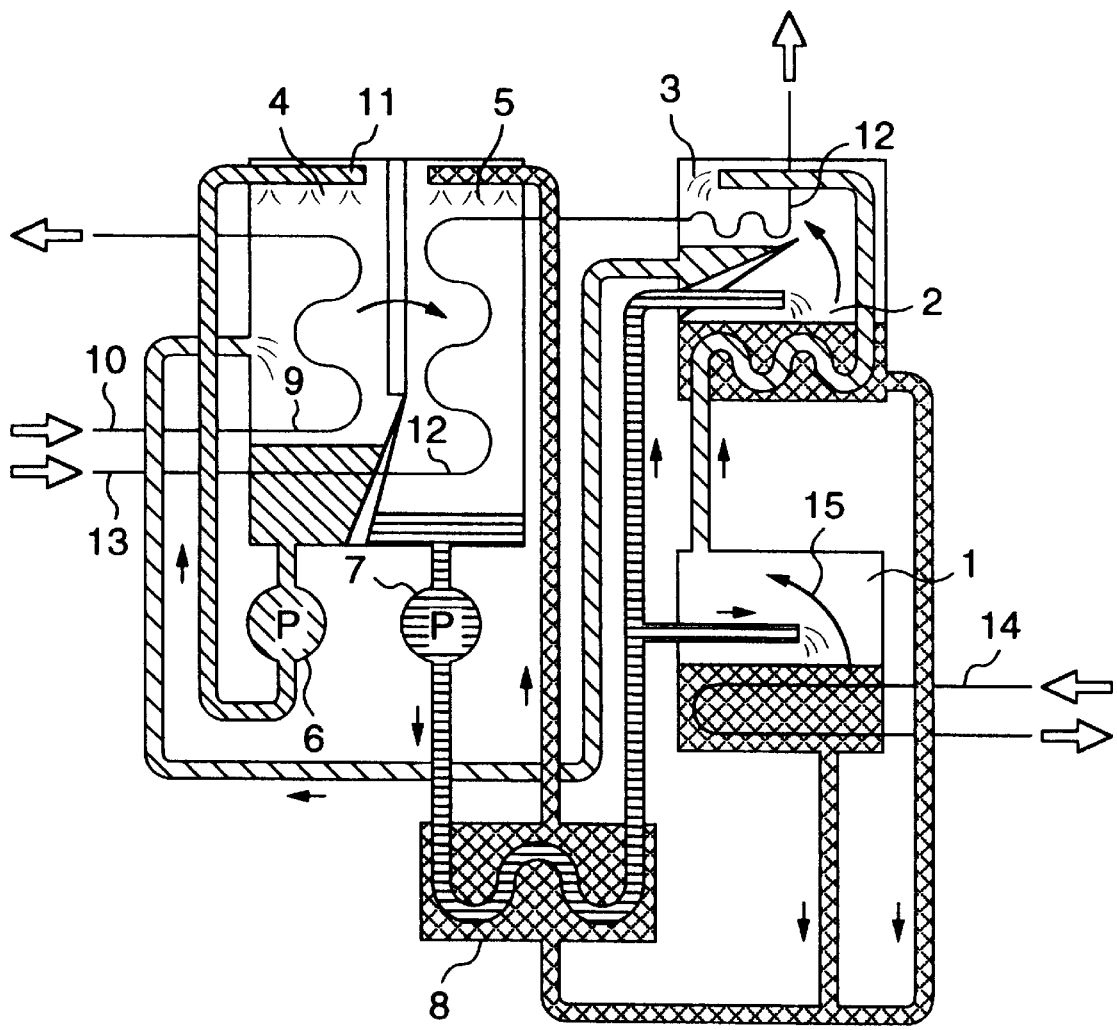
FIG. 4 is an illustration of flows of a refrigerant, a weak solution and a strong solution in the embodiment of FIG. 1.

The above-mentioned apparatuses function as follows, respectively, and the refrigerant, a weak solution and a strong solution as the absorption solution flow as indicated in FIG. 4.

(A) Evaporator (4)

A chilled water 10 flows through tubes of an evaporator tube bundle 9 of the evaporator 4, and the refrigerant circulated by the refrigerant pump 6 is sprayed on the tube outsides of the tube bundle 9 from a spray tree 11, so that heat is removed from the chilled water flowing through the evaporator tube bundle 9 by evaporation latent heat of the refrigerant.

(B) Absorber (5)

A lithium bromide absorption solution has a vapor pressure remarkably lower than that of a water at the same temperature and has a function to absorb refrigerant vapor generated from the evaporator 4 at a fairly low temperature (about 5 degrees centigrade). Therefore, in the absorber 5, the refrigerant vapor evaporated in the evaporator 4 is absorbed by the lithium bromide absorption solution sprayed on the outsides of a cooling pipe 12 of the absorber 5 and absorption heat generated at that time is cooled by a cooling water 13 flowing through the cooling pipe 12.

(C) High temperature generator (1) and Low temperature generator (2)

The absorption solution, the concentration of which has been lowered by the absorbing of the refrigerant in the absorber 5, is decreased in its absorption capacity (the absorption solution absorption capacity of which has been decreased is referred to as a weak solution hereinafter). A portion of the weak solution is supplied to the high temperature generator 1 by the solution pump 7 and heated by heating steam 14 to evaporate and separate refrigerant vapor 15. The weak solution is concentrated in the high temperature generator 1 and returned to the absorber 5 as the strong solution, namely as the absorption solution having recovered its absorption capacity.

A portion of the weak solution coming out of the absorber 5 is supplied to the low temperature generator 2 by the solution pump 7 to be heated by the high temperature refrigerant vapor 15 generated in the high temperature generator 1 to be concentrated so as to become the absorption solution having its absorption capacity recovered. In the heat exchanger 8, this absorption solution combines with the absorption solution from the high temperature generator 1 and then returns to the absorber 5.

(D) Condensor (3)

The high temperature refrigerant vapor 15 separated in the high temperature generator 1 releases a portion of its heat in the low temperature generator 2 and then enters the condenser 3 to be cooled there by the cooling water 13 flowing through the cooling pipe 12 so as to be condensed and liquefied to the refrigerant which returns to the evaporator 4.

(E) Heat exchanger (8)

The heat exchanger 8 serves to preheat the low temperature weak solution flowing from the absorber 5 to the high temperature generator 1 and the low temperature generator 2 by the high temperature absorption solution flowing from the high temperature generator 1 and the low temperature generator 2 to the absorber 5 to enhance heat efficiency.

(F) Refrigerant pump (6) and Solution pump (7)

The refrigerant pump 6 circulates the refrigerant (generally a water is used, and also in this embodiment the water is used), and the solution pump 7 circulates the absorption solution (the lithium bromide solution).

An arrangement of a control system is as follows.

A pressure detecting sensor 16 is arranged as a pressure detecting means in the high temperature generator 1, and a signal from this pressure detecting sensor 16 is used as a desired value externally setting signal (RSP) for a temperature controller (TIC) 17.

More particularly, the pressure and the solution temperature in the high temperature generator 1 are detected in order to maintain the solution concentration in the high temperature generator 1 constant, and each set point of the solution temperature at each time is made to change continuously so that the concentration becomes constant on the Deuhring's diagram based on the pressure signal of the high temperature generator 1. Thus the solution temperature is controlled by the temperature controller to be explained later so as to achieve its set temperature (desired temperature). The desired value externally setting signal is the pressure signal of the high temperature generator 1 for setting the solution temperature of the high temperature generator 1 for the temperature controller.

Further, a signal from the pressure detecting sensor 16 is used also as an input signal for a function converter 18.

On the other hand, in order to measure the temperature of the absorption solution returning from the high temperature generator 1 to the absorber 5, a temperature detecting sensor 19 is mounted to a passage for the absorption solution returning from the high temperature generator 1 to the absorber 5 to provide input signals for the temperature controller 17. A selection converter (HS) 20 which selects and outputs the larger of the two input signals is connected to the output sides of the temperature controller 17 and the function converter 18. The output signal from this selection converter 20 is inputted to a rotational speed controlling device 21 for setting an inverter frequency. The signal from this rotational speed controlling device 21 is inputted to the solution pump 7 for circulating the absorption solution from the absorber 5 to the high temperature generator 1 and the low temperature generator 2 so as to be used as a rotational speed setting signal for controlling the rotational speed of the solution pump 7.

Next, a controlling operation of the two stage absorption chiller having the above-mentioned arrangement will be explained with reference to FIGS. 2 and 3.

Figure 2:
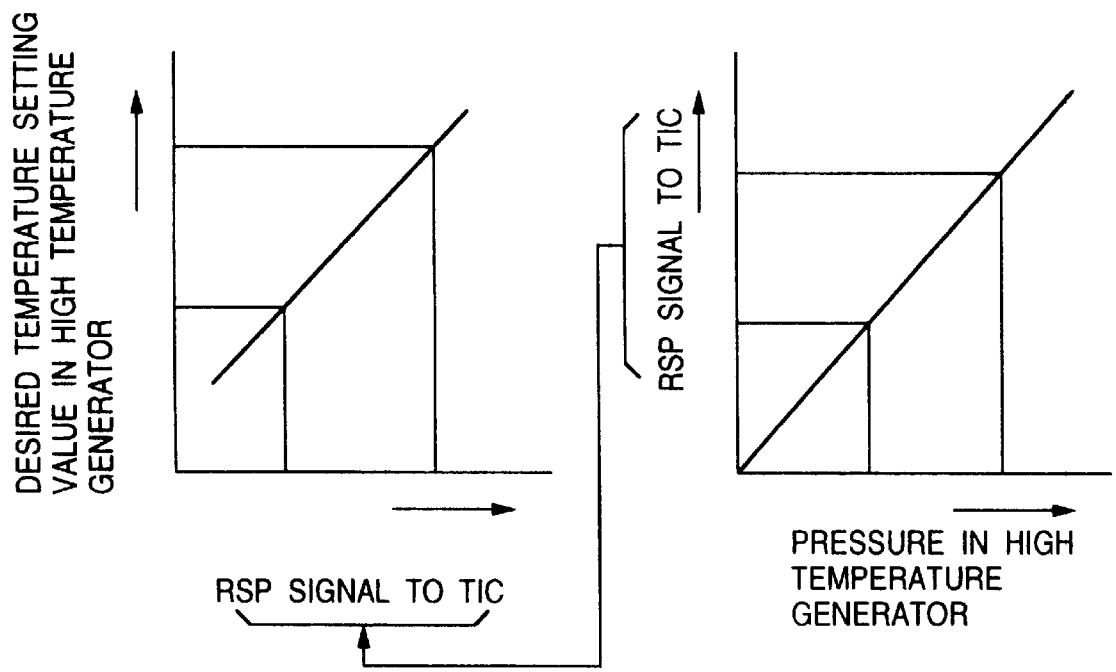
FIG. 2 is an explanatory view for controlling a solution concentration in a high temperature generator so as to be kept constant in the embodiment of FIG. 1.

FIG. 2 shows the above-mentioned arrangement for controlling the concentration in the high temperature generator 1 so as to be kept constant. In this control, when the pressure within the high temperature generator 1 increases, the scaling is carried out so as to raise the set point of the temperature controller 17 to a predetermined high set point. In this case, the concentration of the absorption solution within the high temperature generator 1 is maintained to a constant valve by changing a desired temperature setting value of the absorption solution within the high temperature generator 1 by a function predetermined so that the concentration becomes constant in accordance with the pressure of the high temperature generator 1. As a practical example, lithium bromide solution as the absorption solution having absorbed a refrigerant used usually has such a characteristic that, in the case that the concentration is kept constant, when a steam saturation pressure equilibrated to that is decided, a temperature of the solution corresponding to that is decided with that single reason. Thereupon, as shown in the right diagram of FIG. 2, when the concentration of the solution is controlled constant, for example to 65% with intent to prevent the crystallization of the lithium bromide solution during the operation of the absorption chiller, the pressure signal of the high temperature generator 1 is converted into a temperature signal corresponding to the concentration of 65% by using the desired value externally setting signal (RSP) of the temperature controller (TIC) 17, as shown in the left diagram of FIG. 2. This temperature signal becomes the desired temperature for setting the concentration of the lithium bromide solution within the high temperature generator 1 to 65%. When an output frequency of an inverter 21 is changed by the temperature controller 17 and a circulation quantity of the solution is increased decreased by the solution circulation pump 7 so that the temperature of the solution in the high temperature generator 1 reaches the desired temperature, it becomes possible to maintain the concentration of the solution within the high temperature generator 1.

Figure 3:
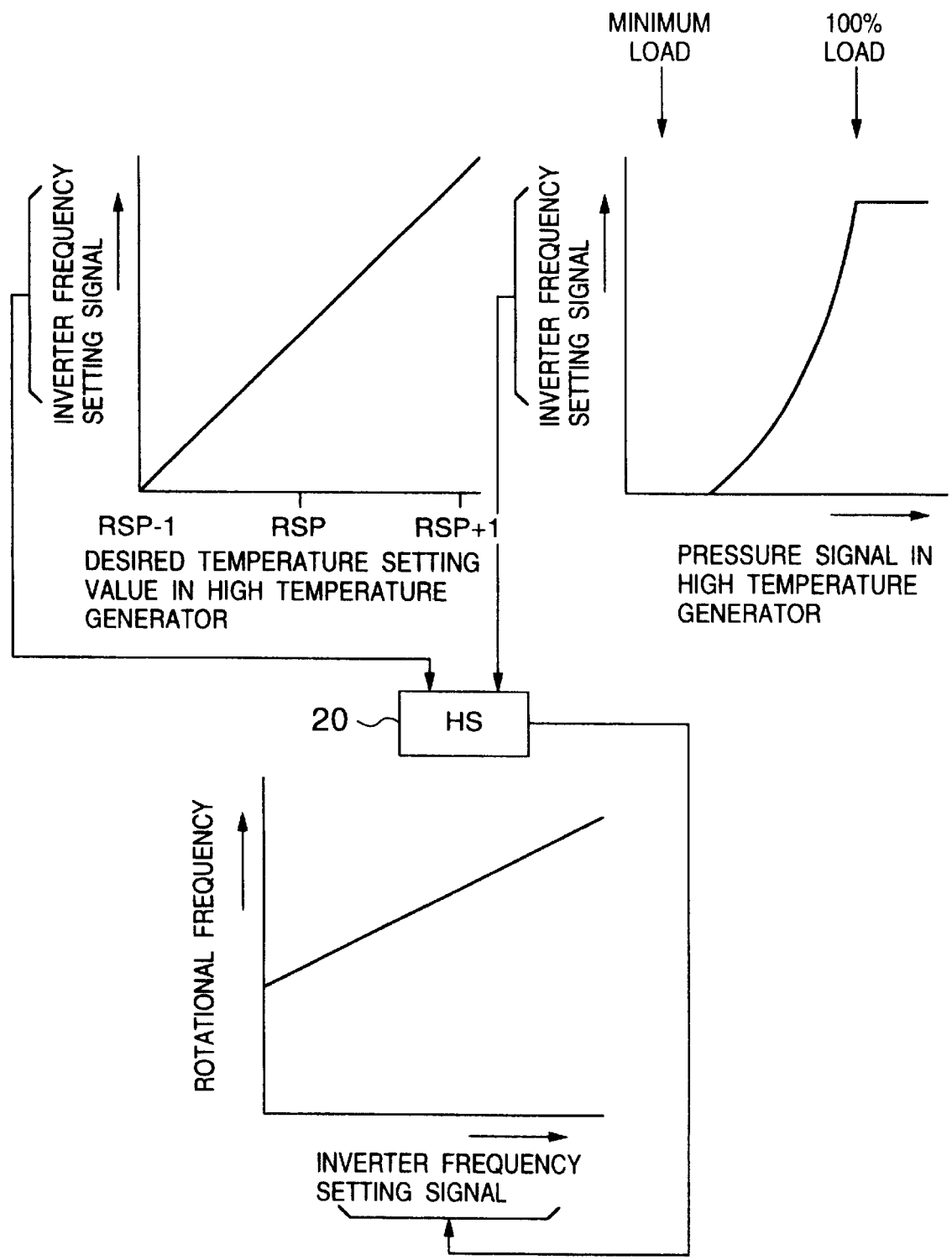
FIG. 3 is an explanatory view in accordance with operations for controlling a circulation quantity of an absorption solution in the embodiment of FIG. 1.

As shown in the upper-right diagram of FIG. 3, though usually the circulation quantity of the absorption solution is controlled by a value set to a function predetermined so as to become an adequate value in accordance with the pressure signal of the high temperature generator 1, when the output signal from the temperature controller 17 becomes larger than the pressure signal from the high temperature generator 1 in comparison between the pressure signal from the high temperature generator 1 to the function converter 18 and the signal from the temperature controller 17, the output signal from the temperature controller 17 is selected by the selection converter 20. Accordingly, for, when the pressure within the high temperature generator 1 increases, a rotational speed controlling device 21 is controlled (the control is carried out by the rotational speed controlling device with the inverter in this embodiment) so as to increase a rotational frequency of the solution pump 7. Thereby, it becomes possible to carry out the control stably throughout the whole load range from the high load range to the low load range. Herein, when an inlet temperature of the cooling water lowers, for instance under the condition of the high load operation, since the pressure within the high temperature generator 1 lowers, the output of the function converter 18 lowers. On one hand, the temperature of the solution in the high temperature generator 1 shall be held in a high state. That is, that the load is held in a high load state even though the cooling water temperature lowers means that the heat quantity inputted into the high temperature generator 1 does not change. For instance in the case of a general specification of the saturated steam at 8 $kg/cm^2G$ in the steam type two stage absorption chiller, since the saturation temperature of this steam is 174° C. and the steam quantity does not change, also the solution temperature within the high temperature generator 1 at which the heat exchange with that steam is performed does not change. Therefore, the temperature of the absorption solution in the high temperature generator 1 shall be held in a high state.

If that condition continues, the concentration of the solution tends to approach a crystallizing concentration. Thereupon, in comparison between an actual temperature detected by the temperature controller 17 and this newly set value (RSP), since the actual temperature is higher than the set value, there exists the + side state with respect to the RSP in the upper-left diagram of FIG. 3. Following this, an output of an inverter frequency setting signal of the temperature controller 17 increases. Then the output of the temperature controller 17 is selected by the selection converter 20.

As a result, the frequency is controlled so as to increase the rotational speed of the absorption solution pump 7 by the rotational speed controlling device 21 in accordance with the temperature of the solution within the high temperature generator 1 based on the output of the temperature controller 17. Since the supply quantity of the low-concentration solution into the high temperature generator 1 is increased by that control, it becomes possible to carry out the control stably so that the absorption solution within the high temperature generator 1 is lowered in the concentration thereof so as not to crystallize the absorption solution.

Further, it becomes possible to control the circulation quantity of the absorption solution adequately throughout the whole operation range from the low load range to the high load range, and thus the solution does not crystallize and also the coefficient of performance of the absorption chiller is improved.

What is claimed is:

1. An absorption chiller including an evaporator for cooling a chilled water, an absorber for absorbing a refrigerant vapor from the evaporator, a high temperature generator and a low temperature generator for separating an absorption solution fed from the absorber under the condition that its absorption capacity has been decreased by the absorbing of the refrigerant vapor into a refrigerant and an absorption solution having recovered its absorption capacity, a condenser for cooling and condensing the refrigerant vapor generated in these high temperature generator and low temperature generator, a solution pump for circulating the solution, and a flow passage for connecting the above-mentioned apparatuses to one another, the absorption chiller further comprising a pressure detecting means for detecting a pressure within said high temperature generator, a concentration fixing control means for controlling a concentration of the solution in said high temperature generator or said low temperature generator so as to be kept constant, a selection converter for receiving two output signals from said pressure detecting means and said concentration fixing control means as inputs, selecting and outputting a higher one of these input signals, and a rotational speed controlling device for controlling a rotational speed of said solution pump by the output signal of said selection converter, so that a circulation quantity of the solution is adequately controlled in a high load range and a low load range.

2. An absorption chiller as set forth in claim 1, wherein said concentration fixing control means includes a temperature controller to which output signals of said pressure detecting means and of a temperature detecting means for the solution from said generator are inputted, and this temperature controller has such a function as to increase a set value to a predetermined high temperature when an increase of the pressure is detected with the signal from said pressure detecting means.

3. An absorption chiller as set forth in claim 1, wherein a function converter for converting the output signal of said pressure detecting means to a predetermined function is arranged between said pressure detecting means and said selection converter.

4. An absorption chiller as set forth in claim 1, wherein said rotational speed controlling device is such a device as to control the rotational speed by an inverter.

5. An absorption chiller including an evaporator for cooling a chilled water, an absorber for absorbing a refrigerant vapor from the evaporator, a high temperature generator and a low temperature generator for separating an absorption solution fed from the absorber under the condition that its absorption capacity has been decreased by the absorbing of the refrigerant vapor into a refrigerant and an absorption solution having recovered its absorption capacity, a condenser for cooling and condensing the refrigerant vapor generated in those high temperature generator and low temperature generator, a solution pump for circulating the solution, and a flow passage for connecting the above-mentioned apparatuses to one another, the absorption chiller further comprising a pressure detecting means for detecting a pressure within said high temperature generator, a concentration fixing control means for controlling a concentration of the solution in said high temperature generator or said low temperature generator so as to be kept constant, a selection converter for receiving two output signals from the pressure detecting means and the concentration fixing control means as inputs, selecting and outputting a higher one of these input signals, and a rotational speed controlling device for controlling a rotational speed of said solution pump by the output signal of said selection converter, said concentration fixing control means includes a temperature controller to which output signals of said pressure detecting means and of a temperature detecting means for the solution from said generator are inputted, this temperature controller has such a function as to increase a set value to a predetermined high temperature when an increase of the pressure is detected with the signal from said pressure detecting means, a function converter for converting the output signal of said pressure detecting means to a predetermined function is arranged between said pressure detecting means and said selection converter, and said rotational speed controlling device is such a device as to control the rotational speed by an inverter, so that a circulation quantity of the solution is adequately controlled in a high load range and a low load range.

6. An absorption chiller including an evaporator for cooling a chilled water, an absorber for absorbing a refrigerant vapor from the evaporator, a high temperature generator and a low temperature generator for separating an absorption solution fed from the absorber under the condition that its absorption capacity has been decreased by the absorbing of the refrigerant vapor into a refrigerant and an absorption solution having recovered its absorption capacity, a condenser for cooling and condensing the refrigerant vapor generated in those high temperature generator and low temperature generator, a solution pump for circulating the solution, and a flow passage for connecting those apparatuses to one another, the absorption chiller further comprising a pressure detecting means for detecting a pressure within said high temperature generator, a temperature detecting means for detecting a temperature of the solution from said high temperature generator, a temperature controller for controlling a concentration of the solution so as to be kept constant by receiving signals as inputs from these pressure detecting means and temperature detecting means, a function converter for converting the signal from said pressure detecting means to a predetermined function, a selection converter for receiving the signal from this function converter and the signal from said temperature controller as inputs and outputting a higher one of these input signals, and an inverter controlling device for controlling a rotational speed of said solution pump by the output signal of said selection converter, so that a circulation quantity of the solution is controlled adequately so as not to cause the crystallization in a high load range and a low load range.

7. An absorption chiller including an evaporator for cooling a chilled water, an absorber for absorbing a refrigerant vapor from the evaporator, a high temperature generator and a low temperature generator for separating an absorption solution fed from the absorber under the condition that its absorption capacity has been decreased by the absorbing of the refrigerant vapor into a refrigerant and an absorption solution having recovered its absorption capacity, a condenser for cooling and condensing the refrigerant vapor generated in those high temperature generator and low temperature generator, a solution pump for circulating the solution and a flow passage for connecting those apparatuses to one another, the absorption chiller further comprising a pressure detecting means for detecting a pressure within said high temperature generator, a temperature detecting means for detecting a temperature of the solution from said high temperature generator, a temperature controller for controlling a concentration of the solution so as to be kept constant by receiving signals as inputs from these pressure detecting means and temperature detecting means, a function converter for converting the signal from said pressure detecting means to a predetermined function, a selection converter for receiving the signal from this function converter and the signal from said temperature controller as inputs and outputting a higher one of these input signals, an inverter controlling device for controlling a rotational speed of said solution pump by the output signal of said selection converter, and a heat exchanger for exchanging heat between the solution discharged from said absorber under the condition that its absorption capacity has been decreased by the absorbing of said refrigerant vapor and the solution from said generators before the solution from said absorber is divided into the flow passages running in parallel to said high temperature generator and said low temperature generator, so that a circulation quantity of the solution is controlled adequately so as not to cause the crystallization in a high load range and a low load range.

8. An absorption chiller as set forth in claim 1, wherein the solution pump for circulating the solution comprises a single pump for circulating the solution to both the high temperature generator and the low temperature generator.

9. An absorption chiller as set forth in claim 5, wherein the solution pump for circulating the solution comprises a single pump for circulating the solution to both the high temperature generator and the low temperature generator.

10. An absorption chiller as set forth in claim 6, wherein the solution pump for circulating the solution comprises a single pump for circulating the solution to both the high temperature generator and the low temperature generator.

11. An absorption chiller as set forth in claim 7, wherein the solution pump for circulating the solution comprises a single pump for circulating the solution to both the high temperature generator and the low temperature generator.

* * * * *